United States Patent [19]

Crosby

[11] 4,080,755

[45] Mar. 28, 1978

[54] SEED TAPE-BEARING REFLECTIVE PLANT MARKER

[76] Inventor: Leslie O. Crosby, 804 Stump Rd., Chalfont, Pa. 18914

[21] Appl. No.: 708,685

[22] Filed: Jul. 26, 1976

[51] Int. Cl.$^2$ .............................................. A01C 1/04
[52] U.S. Cl. ......................................... 47/56; 47/26; 47/74; 47/84; 111/99
[58] Field of Search ............... 40/10 C; 206/495, 487, 206/486; 47/56, 26, 32, 47, 74, 84; 111/99

[56] References Cited

U.S. PATENT DOCUMENTS

| 189,653 | 4/1877 | Pudigon | 47/26 |
| 1,788,826 | 1/1931 | Domber et al. | 206/487 |
| 2,648,165 | 8/1953 | Nestor | 47/56 |
| 2,777,253 | 1/1957 | Bensin | 47/26 X |
| 3,098,320 | 7/1963 | Estkowski | 47/56 |
| 3,098,321 | 7/1963 | Estkowski et al. | 47/56 |
| 3,328,916 | 7/1967 | Okita et al. | 47/56 |
| 3,643,795 | 2/1972 | Watwood et al. | 47/56 |
| 3,908,308 | 9/1975 | Meyers | 47/56 |

FOREIGN PATENT DOCUMENTS

| 74,703 | 5/1917 | Austria | 47/56 |
| 2,332,417 | 1/1974 | Germany | 47/56 |
| 2,253,350 | 5/1974 | Germany | 40/10 C |
| 5,643 of | 1911 | United Kingdom | 40/10 C |
| 776,447 | 6/1957 | United Kingdom | 206/487 |

*Primary Examiner*—Edgar A. Burr
*Assistant Examiner*—Steven A. Bratlie

[57] ABSTRACT

A plant marker which serves not only to facilitate the implant of seeds at the proper depth, but also functioning to encourage the upward growth of the seedlings. The marker is constituted by a tab which is insertable in soil to a depth determined by a ground line which divides the front face of the tab into a short lower section and a longer upper section. Mounted across the lower section is a piece of bio-degradable tape encapsulating the seeds to be planted. The upper section is coated with a light-reflecting layer whereby when the marker is buried in soil, the resultant seedlings will intercept the rays of the sun advancing toward the upper section and will be directly exposed to incident rays on one side, the other side of the seedlings being exposed to reflected radiation, whereby the seedlings will not elongate and incline toward the source of the rays but will grow upwardly.

13 Claims, 6 Drawing Figures

SEED TAPE-BEARING REFLECTIVE PLANT MARKER

BACKGROUND OF INVENTION

This invention relates generally to plant markers, and more particularly to a seed-bearing marker which functions not only to implant seed at the proper depth and to identify the plant but also to encourage proper upward growth of the emerging seedlings.

The traditional technique for planting flower, vegetable, herb or tree seeds indoors involves boring a small hole in the soil to a depth appropriate to the particular species and then depositing a correct quantity of seed in the hole. After covering over the hole with soil, the usual practice is to place a small tab beside the site in order to identify the location and the type of plant being grown. The usual practice in an outdoors garden is to dig a shallow trench and to sprinkle the seeds along it, the trench then being covered with soil and marked.

With traditional planting methods, there is considerable possibility of error on the part of the gardener both in the depth of planting and the number of seeds planted. To avoid such errors, it is known to make use of marker seed tabs such as those disclosed in U.S. Pat. Nos. 3,098,320; 3,098,321 and 3,908,308. Markers of the type disclosed in these patents make use of a tab having a ground line printed thereon to indicate the proper depth of insertion, the seeds being adhered to the tap below the ground line.

In order to secure the seeds to the tab, U.S. Pat. No. 3,908,308 places the seeds in a hole formed on the marker and seals the seeds therein by means of soluble wax. U.S. Pat. No. 3,098,320 and 3,098,321 make use of an adhesive for holding the seeds in place.

With seed-bearing markers of the type heretofore known, the seedlings which emerge when the seeds germinate tend to incline in the direction of the light source to which they are exposed rather than to grow upwardly, for the seedlings are exposed to light on one side only, illumination of the other side being blocked by the marker. Hence the resultant plants fail to assume a properly erect form.

SUMMARY OF INVENTION

In view of the foregoing, it is the main object of this invention to provide a seed-bearing marker which not only facilitates the implant of seeds at the proper depth but also functions to stimulate the upward normal growth of the seedlings.

More particularly, it is an object of this invention to provide a marker of the above type which is adapted to irradiate the emerging seedlings with light reflected from the front face thereof, whereby the seedlings which intercept light rays advancing toward this face are exposed to light on all sides and not only on the side facing the light source.

A significant feature of the invention is that the seeds carried by the marker are encapsulated in a piece of bio-degradable tape whose ends are latched to the marker, thereby avoiding the use of adhesive or other chemical bonding means that might give rise to an undesirable chemical reaction with the seeds or soil. Most adhesives will chemically interact with the stored seeds so that after a few months storage, germination of the seeds will be drastically reduced.

Briefly stated, these objects are attained in a marker constituted by a tab whose front face is divided by a ground line into a short lower section and a longer upper section whereby the tab may be inserted into the soil to the depth indicated by the ground line.

Mounted across the lower section in parallel to the ground line is a piece of bio-degradable tape encapsulating the seeds to be planted, the ends of the piece being inserted in slots cut into lower sections whereby the piece is held thereto without adhesive. The upper section is provided with a light-reflective layer whereby when seedlings emerge from the soil they intercept light rays advancing toward the reflective layer and are exposed both to incident rays and to reflected radiation whereby upward growth of the seedling is encouraged. Moreover, during the short day lengths of the winter months, the reflective characteristic of the marker serves to augment the total amount of light exposure for more rapid growth. The reverse face of the tab may be used to illustrate the plant, cultural instructions being printed on either face.

OUTLINE OF DRAWING

For a better understanding of the invention as well as other objects and further features thereof, reference is made to the following detailed description to be read in conjunction with the accompanying drawings, wherein:

FIG. 6 illustrates the manner in which a seedling emerging from the marker seed is irradiated both by direct sunlight and reflected radiation.

DESCRIPTION OF INVENTION

Figure 1:
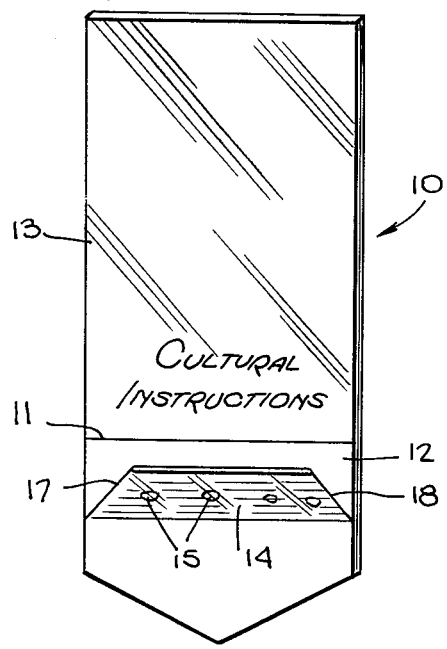
FIG. 1 shows a first preferred embodiment of a seed-bearing plant marker in accordance with the invention as seen looking toward the front face thereof.
Figure 2:
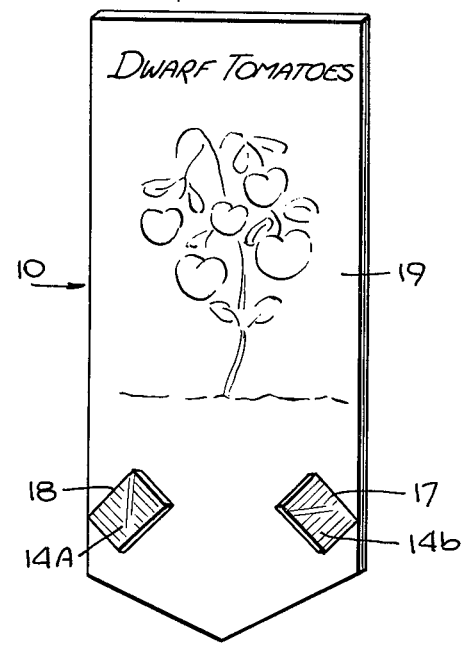
FIG. 2 is the same marker as seen looking toward the rear face thereof.

Referring now to FIGS. 1 and 2, there is shown a preferred embodiment of a seed-bearing marker in accordance with the invention. The marker is constituted by a rectangular tab 10 formed of moisture-resistant cardboard, flexible plastic or other material of sufficient strength so that it will not be crumpled when inserted in the soil, the lower end having a triangular form to provide a point for facilitating insertion.

The front face of the tab is divided by a ground line 11 into a short lower section 12 and a longer upper section 13, the ground line indicating the proper depth of soil insertion. Since this depth depends on the nature of the seed, the position at which the ground line is printed on the tab is determined by the type of seed borne thereby.

Mounted across lower section 12 in parallel to ground line 11 is a piece of tape 14 which encapsulates a charge of seed 15. The seed tape is generally flat, though it may be thickened or rounded at intervals when there are large seeds, since many seeds are thicker than the tape. The seed tape is preferably of the kind disclosed in U.S. Pat. No. 3,328,916 made from water-soluble bio-degradable material, such as polyethylene oxide or polyvinyl alcohol.

Figure 3:
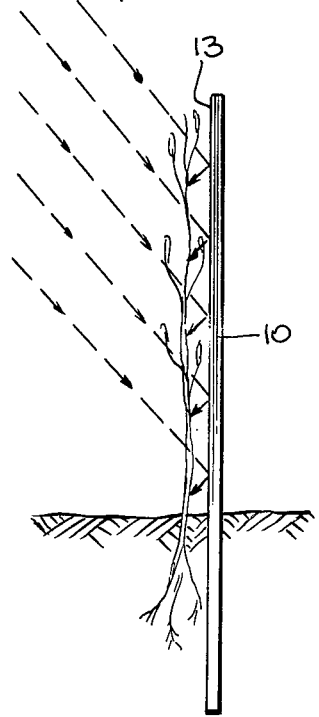
FIG. 3 illustrates a spool supply for a seed-encapsulating tape which is used in making the marker.
Figure 8:
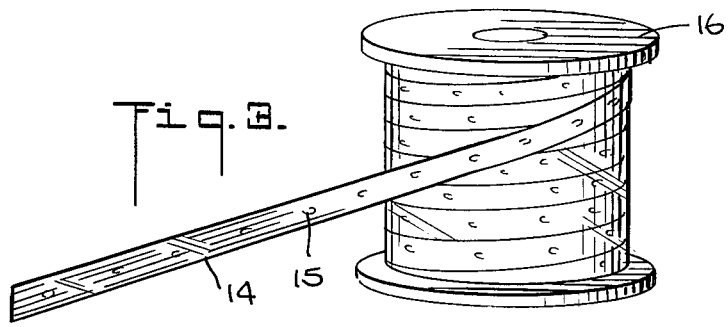

In practice, a continuous tape 14 containing seeds of the desired species may be purchased from a seed supplier, the tape being wound on a spool 16, as shown in FIG. 3. The tape is thereafter cut into pieces of a length appropriate to the marker.

In order to secure the piece of tape 14 to the marker tab without the use of adhesive or other chemical bonding agent that might react adversely with the seeds or soil and thereby impair germination of the seeds, the ends 14A and 14B of the piece are inserted in slits 17 and 18 cut at an angle into the opposite edges of the tab below the ground line. The tape is somewhat thicker than the slit, and because the tab is made of yieldable material, the slits then act to clamp these ends. In practice, the tape which encapsulates the seed may include a trace of water-soluble nutrient, such as ten parts per million of phosphorus.

Upper section 13 of the front face is coated with a layer of light-reflective material. For this purpose, the front face may have an aluminum foil adhered thereto, or a ply or aluminized Mylar or polyethylene film. Alternatively, the reflective layer may be created by printing the upper section with a reflective vegetable dye or oil-base ink.

One may also imprint on this front face (or on the reverse face) cultural instructions for the particular seed borne by the marker, such as frequency of watering, the desired amount of light exposure, and the appropriate type of fertilizer. On the reverse face 19 of the tab, the nature of the plant may be illustrated, and the manufacturer or seller of the marker identified.

When in time the seeds implanted in the soil germinate and sprout, the resultant seedling, as shown in FIG. 6, is exposed to rays of sunlight which advance toward the reflective layer on upper section 13 of the front face. The seedling intercepts these rays; hence the side of the seedling facing the light source is exposed to incident light.

The rays which strike the reflective layer are reflected thereby and serve to irradiate the side of the seedling away from the light, thereby subjecting the seedling to light in all directions. As a consequence, the growing seedling, which has heliotropic characteristics, does not incline toward the natural light source, for light also strikes in the opposite direction, and the seedling therefore tends to group upwardly.

Figure 4:
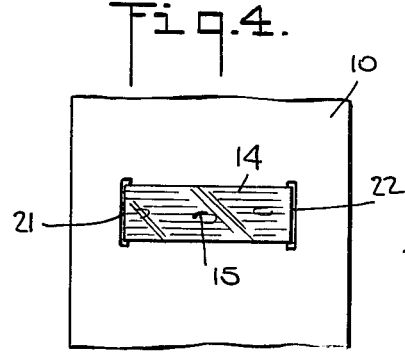
FIG. 4 is a partial view of another embodiment of the invention, the marker being shown in a front face view.
Figure 5:
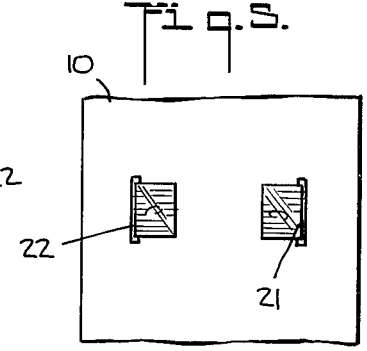
FIG. 5 is the rear face of the marker shown in FIG. 4.

In the embodiment shown in FIGS. 4 and 5, the ends of the tape are inserted in parallel notches 21 and 22 cut into the body of the tab rather than in edge slits. In practice, the tape pieces may be sliced by automatic machinery from a continuous tape and stapled to the tab, or the ends may be forced into notches by reciprocating pusher blades.

While there have been shown and described preferred embodiments of a seed-bearing marker in accordance with the invention, it will be appreciated that many changes and modifications may be made therein without, however, departing from the essential spirit thereof. For example, the tab may be curved to form a concave reflector to concentrate light on the seedling. The advantage of using aluminum foil as the reflective surface is that it absorbs heat from the incident light rays and radiates the heat to warm the seedling. This feature is beneficial for heat-loving plants such as cactus, geraniums, tomatoes and peppers.

I claim:

1. A seed-bearing marker comprising a tab having a ground line on the front face thereof at a level appropriate to the type of seed being sown, the ground line dividing the front face into a short lower section insertable into the soil and a longer upper section above the soil, a piece of biodegradable tape extending across the lower section parallel to the line, said tape encapsulating a charge of seed, the ends of said tape being mechanically latched to said tab, there by avoiding the presence of chemical bonding agents that might react unfavorably with the seeds or the soil, said upper face having a highly reflective layer thereon whereby incident light is reflected by this layer, and seedlings emerging from the seed are exposed both to incident light and to reflected radiation to a degree whereby the seedlings will not elongate and incline toward the source of light but will grow upwardly.

2. A marker as set forth in claim 1, wherein said tab is provided with a pair of angled slits cut into the opposing edges thereof, the ends of the tape piece being forced into said slits to secure the piece to the tab.

3. A marker as set forth in claim 1, wherein said tab is provided with a pair of parallel notches into which the ends of the piece are forced to secure the piece to the tab.

4. A marker as set forth in claim 1, wherein the tape piece is formed of water-soluble polyethylene oxide.

5. A marker as set forth in claim 4, wherein said polyethylene oxide is intermingled with a water-soluble plant nutrient.

6. A marker as set forth in claim 1, wherein the reverse face of the tab carries an illustration of the type of plant which emerges from the seeds.

7. A marker as set forth in claim 1, wherein said layer is formed from a metal foil laminated to said upper section.

8. A marker as set forth in claim 7, wherein said foil is aluminum which serves not only to reflect the rays but also to absorb heat therefrom and to radiate the heat to warm the seedling.

9. A marker as set forth in claim 1, wherein said lower section is pointed to facilitate insertion.

10. A marker as set forth in claim 1, wherein said tab is formed of moisture-resistant cardboard.

11. A marker as set forth in claim 1 wherein said tape piece is formed of polyvinyl alcohol.

12. A marker as set forth in claim 1, wherein said tab is curved to form a concave reflector to concentrate rays on the seedling.

13. A marker as set forth in claim 1, wherein the ends of the tape are stapled to said tab.

* * * * *